March 26, 1963 H. M. JANOWSKI 3,082,604
SERVOMOTOR DRIVEN FLUID PRESSURIZING DEVICE
Filed June 29, 1959
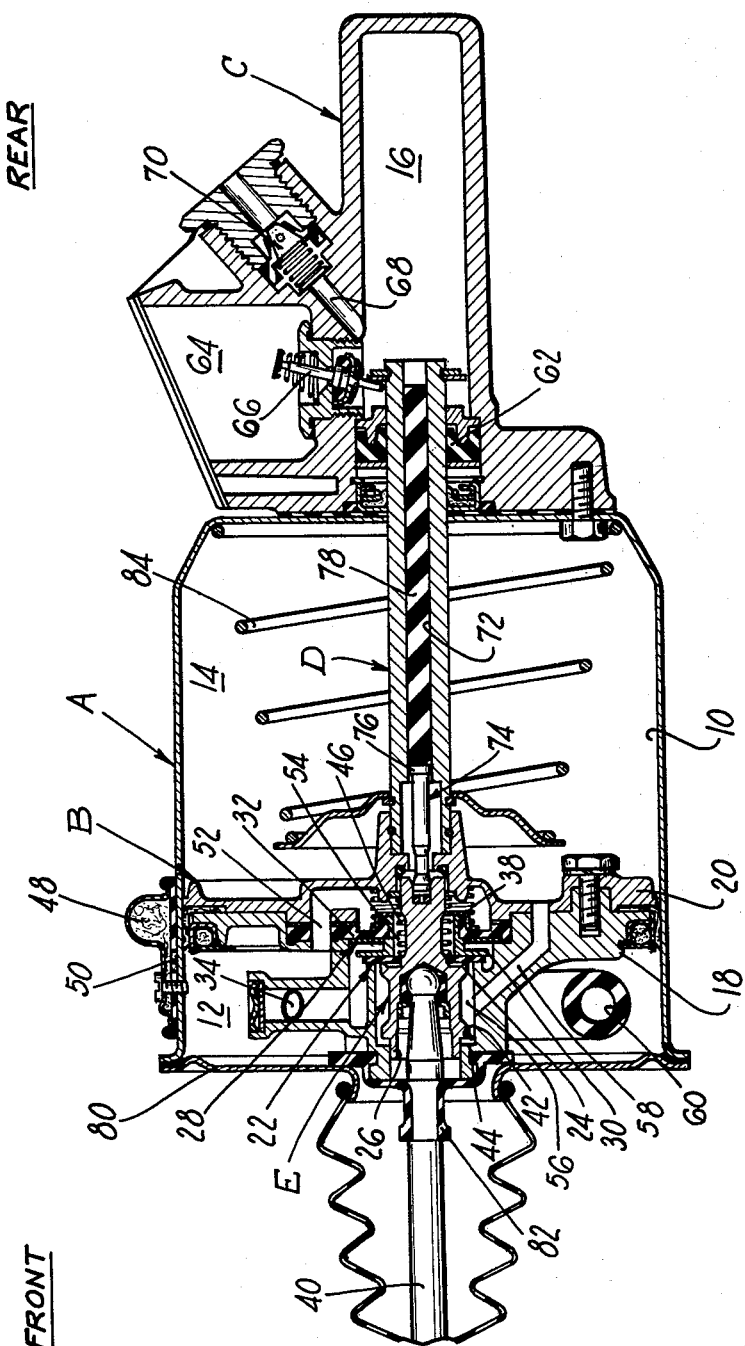
INVENTOR.
HENRY M. JANOWSKI
BY
William P. Hickey
ATTORNEY

United States Patent Office 3,082,604
Patented Mar. 26, 1963

3,082,604
SERVOMOTOR DRIVEN FLUID PRESSURIZING
DEVICE
Henry M. Janowski, South Bend, Ind., assignor to The
Bendix Corporation, a corporation of Delaware
Filed June 29, 1959, Ser. No. 823,597
7 Claims. (Cl. 60—54.6)

The present invention relates, as indicated, to servomotor driven fluid pressurizing devices; and more particularly to a new and improved power reaction means for such devices.

A principal object of the present invention is the provision of a new and improved reaction producing structure for servomotors and the like which is very simple and economical to manufacture.

The invention resides in certain constructions and combinations and arrangements of parts; and further objects and advantages will become apparent to those skilled in the art to which the invention relates from the following description of the preferred embodiment described with reference to the accompanying drawing forming a part of this specification, and in which the solitary FIGURE of the drawing is a cross sectional view of a power operated master cylinder of the type used in automotive braking systems, and which embodies principles of the present invention.

The power operated master cylinder shown in the drawing generally comprises a fluid pressure servomotor A having a power chamber 10 therein that is divided into front and rear opposing chambers 12 and 14, respectively, by a movable wall or power piston B, and a hydraulic master cylinder C having a hydraulic chamber 16 that is axially aligned with the power chamber 10 and into which a displacement portion D of the power piston B projects to displace fluid from the hydraulic chamber 16. The servomotor shown is of the type which is actuated by a suitable source of vacuum, such as from the manifold of the attached vehicle's propelling engine; and a control valve structure E is carried by the power piston B for establishing atmospheric pressure across the power piston B in its normal deenergized condition of the servomotor and for admitting vacuum to the rear opposing chamber 14 during actuation of the servomotor.

The power piston B is formed by means of front and rear piston sections 18 and 20 respectively which are suitably shaped and bolted together to conveniently provide the various chambers and passages of the control valve structure E. The control valve structure E generally comprises a vacuum valve seat 22 that is molded into the front half piston section 18, an atmospheric valve seat 24 formed integrally on a movable control member 26 located concentrically within the vacuum valve seat 22, and an annular poppet member 28. The annular poppet member 28 is generally a spool-shaped structure having a rubber coated front flange 30 for sealing abutment with the valve seats 22 and 24, and a flexible rear flange or diaphragm 32—the outer edges of which are clamped between the piston sections 18 and 20 to close off the valve's annular vacuum chamber 34 from the other chambers of the valve. The center section of the annular poppet member 28 is a generally metallic tubular structure whose front end is laterally turned to form the body of the front flange 30, and the rear end of the main body section of the poppet member 28 is provided with an annular groove which receives a preformed lip of the diaphragm 32 and which is clamped into the groove by an annular cup-shaped washer 36. The annular poppet member 28 is biased forwardly by a coil spring 38 so that its front flange 30 normally sealingly engages the vacuum valve seat 22.

In the released, or normal at rest condition of the servomotor, and wherein no actuating force is applied to the control rod 40 for the control member 26, the front shoulder 42 is biased into engagement with a stopping surface 44 on the piston section 18, by a valve return spring 46 so that the atmospheric valve seat 24 will normally be out of engagement with the flange 30 of the poppet member 28. Atmospheric pressure is continually communicated to the front opposing power chamber 12 through a suitable air filter 48 and opening 50 in the shell of the servomotor, and is thereafter transmitted by a suitable passageway 52 in the power piston B to the areas rearwardly of the diaphragm 32 and the central opening of the annular poppet member 28. Since in the normal condition of the control valve structure, previously described, the atmospheric valve seat 24 is out of engagement with the front flange 30 of the annular poppet member 28, air pressure is free to flow from the center opening 54 of the poppet member 28 to the control chamber 56 of the valve. The control chamber 56 lies in the region between the atmospheric and vacuum valve seats 24 and 22, and air pressure thence flows through control passage 58 in the power piston to the rear opposing power chamber 14 thereby establishing atmospheric pressure on both sides of the power piston.

Vacuum is supplied to the annular vacuum chamber 34 by a flexible rubber conduit 60 having a connection not shown which extends through the sidewalls of the servomotor; and the control valve structure is actuated by forcing the control member 26 rearwardly to seat the atmospheric valve seat upon the front flange 30 of the valve poppet 28 thereby closing off communication of atmospheric pressure to the rear opposing power chamber 14. Continued rearward movement of the control member 26 thereafter lifts the front flange 30 of the poppet member 28 out of engagement with the vacuum valve seat 22 to thereafter permit vacuum from the vacuum chamber 34 to be admitted to the valve's control chamber 56 and hence reduce the pressure in the rear opposing power chamber 14 to cause the power piston B to move rearwardly. Rearward movement of the power piston B causes its displacement portion D to move into the hydraulic chamber 16 and thereby displace fluid from the hydraulic master cylinder C.

The master cylinder C is generally of the construction shown and described in the Earl R. Price Patent No. 2,818,710, and for a complete understanding of its construction reference may be had to that patent. In order that an understanding of the functioning of the master cylinder C can be had without reference to the patent, a brief description of the structure shown will now be given.

Suitable sealing structure 62 is provided around the fluid displacement member D where it enters the hydraulic chamber 16; and in order that the unit will not be made inoperative by small leaks or volume changes in the braking system which it actuates, a reservoir 64 of compensating fluid is provided in the region above the hydraulic chamber 16. Communication between the reservoir 64 and the hydraulic chamber 16 is controlled by a tilt valve structure 66 which is tilted open by a suitable washer on the end of the fluid displacement member D as it approaches its retracted position. The tilt valve 66 closes as the displacement member D is moved rearwardly to prevent flow of fluid from the chamber 16 to the reservoir 64. Rearward movement of the fluid displacement member D causes fluid to flow out of the discharge passage 68 through a conventional residual pressure check valve structure 70 which permits fluid to flow freely out of the hydraulic chamber 16 but which offers a certain amount of the back pressure to fluid that is returning to the hydraulic chamber 16.

According to principles of the present invention, new and improved means are provided for providing a reactive force upon the control member 26, which force is generally proportional to the hydraulic pressure that is created in the chamber 16. One of the difficulties of some prior art structures has been that a rupture of the flexible sealing means that were used to separate chamber 16 from the control means E would depressurize the hydraulic chamber 16, and thereby completely disable the brakes of the automotive vehicle which it operated. The reaction producing structure provided by the present invention comprises a tubular fluid displacement member D having an opening 72 therethrough which extends from the fluid pressurizing chamber 16 to the forward end of the valve's control member 26. A portion of the valve's control structure is slidably received in the adjacent end of the central opening 72 of the displacement member D. In the embodiment shown in the drawing, this portion is formed by a short reaction plunger 74 that is positioned rearwardly of control member 26 with its headed flange portion 76 slidably received in the adjacent end of the central opening 72; and alternatively this plunger 74 may be made as an integral part of control member 26. The reaction producing structure is completed by a cylindrical plug 78 of an elastomeric compound (preferably a natural or synthetic rubber, and the embodiment shown in the drawing is neoprene) is fitted into the opening 72 between the head 76 of the reaction plunger and the hydraulic chamber 16. The rubber plug 78 preferably has a slight interference fit with respect to the opening sidewalls 72, and is preferably coated with a suitable lubricant before it is forced into the opening of the fluid displacement member.

In the normal condition of the power operated master cylinder shown in the drawing, the shoulder 42 of the control valve element 26 engages the stopping surface 44 so that atmospheric pressure from the front opposing power chamber 12 is communicated by means of passageway 52, through the central opening 54 of the poppet member 28, past the now open atmospheric valve seat 24, and through the control passage 58 to the rear power opposing chamber 14. The unit is actuated by moving the control rod 40 inwardly to seat the atmospheric valve seat 24 against the poppet member 28, thereby closing off atmospheric communication to the rear power opposing chamber 14; and thereafter further movement of the rod 40 inwardly lifts the poppet member 28 out of engagement with the vacuum valve seat 22. Vacuum from the vacuum chamber 34 is thereby communicated to the control passage 58 and rear opposing power chamber 14 to establish a differential pressure across the power piston B which forces the fluid displacement member D into the hydraulic chamber 16. Initial movement of the fluid displacement member D allows the tilt valve structure 66 to close and thereafter develop pressure within the hydraulic chamber 16. As hydraulic pressure develops in the chamber 16, its fluid pressure is exerted on the end of the cylindrical plug 78 causing it to be deformed tightly up against the sidewalls of the opening 72 to form a tight liquid seal therewith, and at the same time causes it to exert a reactive force up against the head of the reaction plunger 74. This reactive force is in turn transmitted to the valve's control member 26 to oppose the actuating force being applied by the operator.

When rearward movement of the control rod 40 is stopped, removal of air from the rear opposing power chamber 14 continues until the power piston B moves rearwardly relative to the control member 26 a sufficient distance to bring the vacuum valve seat 22 up into engagement with the annular poppet member 28 to thereafter prevent a further buildup in pressure differential across the power piston B. This establishes what is known as a lapped condition of the valve; and during this lapping movement, the fluid displacement member will move slightly rearwardly over the rubber plug 78 to accommodate the relative movement of the valving parts. Since the hydraulic pressure which has been generated in the hydraulic chamber 16 is continuously exerted upon the rubber plug 78, it will at all times be biased into a sealing engagement with the sidewalls of the opening 72; and it has been found that by using a rubber plug 78 of sufficient axial length, a single rubber plug can be used to both seal off the opening 72 to prevent leakage of fluid out of the hydraulic chamber 16, and at the same time provide a readily movable structure for transferring reactive force to the control member 26 which structure will accommodate the relative movements of the unit's control valve structure.

When it is desired to release the braking effort, a release of force on the control rod 40 permits the hydraulic pressure in the chamber 16 to force the plug 78 forwardly relative to the displacement member D so as to lift the atmospheric valve seat 24 out of engagement with the annular poppet member 28 and allow a flow of air into the rear opposing power chamber 14, thereby decreasing the differential pressure across the power piston B. The control member 26 will be moved forwardly by the plug 78 until the force which is maintained on the rod 40 equals the reactive force which the reactive plug 78 transmits to the control member 26; whereupon the rubber plug 78 becomes stationary, and the displacement portion D moves forwardly over the rubber plug 78 sufficiently to cause the front face of the annular member 28 to again move up into sealing engagement with the atmospheric valve seat 24. Further forward movement of the power piston B is thereby prevented and hydraulic pressure which is maintained within the chamber 16 will produce a reactive force in the plug 78 which just opposes the force being held on the control rod 40. When all force is removed from the control rod 40, the control member 26 is forced into engagement with the stop 44 by the rubber plug 78 and valve return spring 46; and the rubber plug 78 and the displacement portion D stay in fixed position relative to each other while the power piston is returned to its stopped position against the end cover plate 80 of the servomotor. A rubber boot 82 is provided between the rod 40 and the power piston B to act both as a seal for the control chamber 56 and as a rubber stop for engaging the end cover plate 80. Return movement of the fluid displacement member D is further assured by a power piston return spring 84 suitably interpositioned between the fluid displacement member D and the rear end of the servomotor.

While the invention has been described in considerable detail, I do not wish to be limited to the particular constructions shown and described, and it is my intention to cover hereby all novel adaptations, modifications and arrangements thereof which come within the practice of those skilled in the art to which the invention relates.

I claim:

1. A power operated fluid pressurizing device comprising: a servomotor having a movable power driven element therein, a fluid pressurizing chamber on one end of said servomotor, said power driven element having a tubular fluid displacement portion projecting into said fluid pressurizing chamber, said tubular fluid dipslacement portion having an elongated opening therein which communicates with said fluid pressurizing chamber, control means carried by said power driven element and having a control structure which when in one position causes said power driven element to assume a position away from said fluid pressurizing chamber, and said control structure having a second position spaced toward said fluid pressurizing chamber for causing said tubular displacement portion to be driven into said fluid pressurizing chamber, said control structure having a portion projecting into the central opening of said tubular fluid displacement portion, and a cylindrically shafted plug of a readily deformable rubberlike elastomeric compound having an elongated body section in said central opening of said tubular displacement portion, one end of said plug being subjected to the fluid in said fluid pressurizing chamber and the other end transferring its compressive force to said portion of said control structure, said plug having a sufficient interference fit and length of contact with the sidewalls of said central opening to produce sufficient frictional contact with said sidewalls to hold the outer surface of said plug stationary against said sidewalls and effect a seal therewith while the center of said plug is movable axially by an amount which follows the control movement of said portion of said control structure.

2. A power operated fluid pressurizing device comprising: a servomotor having a movable power driven element therein, a fluid pressurizing chamber on one end of said servomotor, said power driven element having a tubular fluid displacement portion projecting into said fluid pressurizing chamber, said tubular fluid displacement portion having an elongated opening therein which communicates with said fluid pressurizing chamber, control means carried by said power driven element and having a control structure which when in one position causes said power driven element to assume a position away from said fluid pressurizing chamber, and said control structure having a second position spaced toward said fluid pressurizing chamber for causing said tubular displacement portion to be driven into said fluid pressurizing chamber, said control structure having a portion projecting into the central opening of said tubular fluid displacement portion, and a plug of rubber having an elongated body section in said central opening of said tubular displacement portion, one end of said plug being subjected to the fluid in said fluid pressurizing chamber and the other end transferring its compressive force to said portion of said control structure having a sufficient interference fit and length of contact with the sidewalls of said central opening to produce sufficient frictional contact with said sidewalls to hold the outer surface of said plug stationary against said sidewalls and effect a seal therewith while the center of said plug is movable axially by an amount which follows the control movement of said portion of said control structure.

3. A power operated fluid pressurizing device comprising: a body structure having axially aligned power and fluid pressurizing chambers; a movable wall in said power chamber having a portion thereof extending into said fluid pressurizing chamber to displace fluid therefrom, said tubular fluid displacement portion having an elongated opening therein which communicates with said fluid pressurizing chamber, control means carried by said movable wall and having a control structure which when in one position equalizes pressure across said movable wall, and said control structure having a second position spaced toward said fluid pressurizing chamber for developing a pressure differential across said movable wall which drives its displacement portion into said fluid pressurizing chamber, said control structure having a portion projecting into the central opening of said tubular fluid displacement portion, and a plug of rubber having an elongated body section in said central opening of said tubular displacement portion, one end of said plug being subjected to the fluid in said fluid pressurizing chamber and the other end transferring its compressive force to said portion of said control structure having a sufficient interference fit and length of contact with the sidewalls of said central opening as to produce sufficient frictional contact with said sidewalls to hold the outer surface of said plug stationary against said sidewalls and effect a seal therewith while the center of said plug is movable axially by an amount which follows the control movement of said portion of said control structure.

4. In a power driven fluid pressurizing device: a body member having a fluid pressurizing chamber therein, a fluid displacement member in said fluid pressurizing chamber, a motor for driving said fluid displacement member into said chamber to develop pressure therein, a control means for said motor, one of said members having a reaction chamber of generally uniform cross section extending between said fluid pressurizing chamber and said control means, said control means having a plunger portion in said reaction chamber, and a reaction plug of a readily deformable rubberlike elastomeric compound having an elongated body section in said reaction chamber extending between said plunger portion and said fluid pressurizing chamber, said plunger portion of said control means being movable into said reaction chamber to actuate said motor, and said reaction plug having a sufficient interference fit and length of contact with the sidewalls of said central opening to produce sufficient frictional contact with said sidewalls to hold the outer surface of said plug stationary against said sidewalls and effect a seal therewith while the center of said plug is movable axially by an amount which follows the control movement of said portion of said control structure.

5. In a power driven fluid pressurizing device: a body member having a fluid pressurizing chamber therein, a fluid displacement member in said fluid pressurizing chamber, a motor for driving said fluid displacement member into said chamber to develop pressure therein, control means for said motor, one of said members having a reaction chamber of generally uniform cross section extending between said fluid pressurizing chamber and said control means, said control means having a plunger portion in said reaction chamber, and a reaction plug of a rubber compound in said reaction chamber having an elongated body section in said reaction chamber extending between said plunger portion and said fluid pressurizing chamber, said plunger portion of said control means being moved against said reaction plug to actuate said motor, and said reaction plug having a sufficient interference fit and length of contact with the sidewalls of said reaction chamber to produce sufficient frictional contact with the sidewalls to hold the outer surface of said plug stationary against said sidewalls and effect a seal therewith while the center of said plug is movable axially by an amount which follows the control movement of said plunger portion of said control means.

6. In a control valve for a servomotor and the like: a body member having a hydraulic reaction chamber of predetermined cross section to one end of which hydraulic pressure is communicated, control valve means including a control member having a portion which projects into the end of said reaction chamber opposite that end to which hydraulic pressure is communicated, said control valve means having a pressure inlet and an outlet and being constructed to open communication therebetween when said control member is moved in a direction forcing said portion into said reaction chamber, and a tightly fitting block of a readily deformable rubberlike elastomeric compound in said reaction chamber and exposed to said hydraulic pressure to be compressed up against said portion of said control member, and said block of rubberlike elastomeric compound having a sufficient interference fit and length of contact with the sidewalls of said reaction chambers to produce sufficient frictional contact with said sidewalls to hold the outer surface of said block stationary in said sidewalls and effect a seal therewith while the center of said block is movable axially by an amount which follows the control movement of said portion of said control member.

7. In a control device: a body member having an axially extending reaction chamber of predetermined cross section to one end of which fluid pressure is communicated, control means for controlling an output signal and including a control member having a portion which projects into the end of said reaction chamber opposite said end to which pressure is communicated, said portion having a normal position in said chamber and said control means being of the type which increases said output signal upon slight movement of said control portion into said chamber from said normal position and which reduces said output signal when said portion moves slightly outwardly of said normal position, and a tightly fitting block of semi-rigid pressurizable material in said reaction chamber and exposed to said pressure fluid to be compressed up against said portion of said control member, and said block of pressurizable material having sufficient interference fit and length of contact with the sidewalls of said reaction chamber to produce sufficient frictional contact with said sidewalls to hold the outer surface of said block stationary against said sidewalls and effect a seal therewith while the center of said block is movable axially by an amount which follows the control movement of said portion of said control member.

References Cited in the file of this patent

UNITED STATES PATENTS

| | | |
|---|---|---|
| 2,126,296 | Weihe | Aug. 9, 1938 |
| 2,532,960 | Stelzer | Dec. 5, 1950 |
| 2,665,179 | Salvatora | Jan. 5, 1954 |
| 2,812,639 | Whitten | Nov. 12, 1957 |

FOREIGN PATENTS

| | | |
|---|---|---|
| 172,797 | Austria | Oct. 10, 1952 |
| 685,339 | Great Britain | Dec. 31, 1952 |
| 766,519 | Great Britain | Jan. 23, 1957 |